United States Patent [19]

Akeel

[11] Patent Number: 5,697,868

[45] Date of Patent: Dec. 16, 1997

[54] PLANETARY SPEED REDUCTION GEAR

[75] Inventor: Hadi A. Akeel, Rochester Hills, Mich.

[73] Assignee: Fanuc Ltd., Yamanashi, Japan

[21] Appl. No.: 586,827

[22] PCT Filed: May 31, 1995

[86] PCT No.: PCT/JP95/01066

§ 371 Date: Jan. 31, 1996

§ 102(e) Date: Jan. 31, 1996

[87] PCT Pub. No.: WO95/33145

PCT Pub. Date: Dec. 7, 1995

[30] Foreign Application Priority Data

Jun. 1, 1994 [JP] Japan ................. 6-120322

[51] Int. Cl.$^6$ ........................................... F16H 1/28
[52] U.S. Cl. ........................................... 475/179
[58] Field of Search ..................... 475/162, 165, 475/178, 179

[56] References Cited

U.S. PATENT DOCUMENTS

| | | | |
|---|---|---|---|
| 2,170,951 | 8/1939 | Perry | 475/178 |
| 2,475,504 | 7/1949 | Jackson | 475/179 |
| 2,656,737 | 10/1953 | Lang | 475/165 |
| 3,239,699 | 3/1966 | Ferrary | |
| 4,183,267 | 1/1980 | Jackson | 475/162 |
| 4,378,623 | 4/1983 | Noguchi | 475/165 |
| 4,678,952 | 7/1987 | Peterson et al. | |
| 4,994,005 | 2/1991 | Rennerfelt | 475/162 |
| 5,123,883 | 6/1992 | Fukaya | 475/162 |
| 5,123,884 | 6/1992 | Kondoh et al. | 475/179 |
| 5,293,107 | 3/1994 | Akeel | |

FOREIGN PATENT DOCUMENTS

| | | |
|---|---|---|
| 63-251647 | 10/1988 | Japan . |
| 2-45554 | 12/1990 | Japan . |
| 4-106543 | 9/1992 | Japan . |

*Primary Examiner*—Dirk Wright
*Attorney, Agent, or Firm*—Nikaido, Marmelstein, Murray & Oram LLP

[57] ABSTRACT

In a planetary speed reduction gear or a frictional epicyclic speed reduction gear (10 to 10E) having a simple construction for practical use, a single planet pinion or a planet friction wheel (11, 11a) is driven for eccentric revolution along an internal gear (12) by an input shaft (17, 25), the planet pinion or the planet friction wheel (11, 11a) is interlocked with an output flange (15) by drive pins (18) supported on the output flange (15) and eccentric disks (19) connected to the drive pins (18) and rotatably supported on the planet pinion or the planet friction wheel (11, 11a).

10 Claims, 4 Drawing Sheets

PLANETARY SPEED REDUCTION GEAR

TECHNICAL FIELD

The present invention relates to a planetary speed reduction unit of a gear type or a friction wheel type, including a single planet pinion or planet friction disk, and a single internal gear or a single internal frictional element having therein a friction inner circumference, which surrounds the planet pinion or the planet friction disk so as to provide a path for a planetary motion, and to be able to reduce a rotative input given thereto by an external rotative drive source or a built-in rotative drive source by a single reduction step at a large reduction ratio to thereby transmit a reduced rotative output to an output element or an output flange.

BACKGROUND ART

There have been several types of planetary speed reduction units, and several types of drive devices with a built-in reduction gear each formed by combining a motor and a reduction gear.

Although there has been a well-known mechanism employing an eccentric pin mechanism for linking a planet pinion that revolves for planetary motion to an output shaft or an output flange, there has been provided neither a mechanism employing a unique linking means including a floating, eccentric, fixed pin linking a planetary gear unit to an output flange concentric with the planetary gear unit nor a drive device with a built-in planetary speed reduction unit provided with a single planet pinion connected to a motor-driven element for rotation and revolution.

For example, U.S. Pat. No. 3,239,699 merely discloses a mechanism constructed by installing a motor and a Harmonic Drive reduction gear in an integral housing.

U.S. Pat. No. 4,678,952 merely discloses a drive mechanism formed by combining a motor and a Harmonic Drive speed reduction unit, and provided with a brake and a position encoder in the hollow central portion thereof.

U.S. Pat. No. 5,293,107 merely discloses an apparatus including, in combination, a motor having a hollow central portion and provided with a non-eccentric planet pinion linked to an output flange, and a planet pinion.

A well-known Rota-Vector RV reduction gear is a planetary speed reduction unit provided with two large planet pinions that rotate and revolve in an internal gear larger than the planet pinions. In the RV reduction gear, the planet pinions are connected to an output flange with an eccentric crankpin arrangement, and the eccentric crankpin is rotated by a torque relative to an output shaft. An external torque is applied to the eccentric crankpin by a drive gear concentric with the eccentric crankpin. The reduction gear may be provided with a central through-hole. Since this type of RV reduction gear is not constructed so as to be internally provided with a drive element that generates rotative input, but is an individual reduction gear, a separate drive motor necessarily needs to be connected to the input element of the RV reduction gear to give an input to the RV reduction gear. Further, a drive system formed by combining an RV reduction gear and a drive motor is relatively expensive.

A well-known Cyclo reduction gear is similar to the afore-mentioned RV reduction gear, except that a plurality of straight pins are extended through oversized holes to be fitted in an output flange and two planet pinions. The oversized holes permit the revolving or orbiting motions of the planet pinions while keeping contact with the straight pins. The Cyclo reduction gear, similarly to the RV reduction gear, is an individual reduction gear and needs to be driven by a separate drive motor. In the Cyclo reduction gear, the revolution of each planet pinion is transmitted to the output shaft through straight pins in contact with the circumferential surfaces of cylindrical holes of a curved plate, each of the cylindrical holes having a diameter larger than that of the straight pin. However, the load capacity of the Cyclo reduction gear is relatively small because the straight pins are in a point contact with the circumferential surfaces of the cylindrical holes.

A well-known Dojen drive has two planet pinions integrally coupled together, which are eccentrically driven in a fixed internal gear and an output internal gear is rotatably connected to the fixed internal gear. The two internal gears are formed by combining a plurality of rollers mounted around the periphery of an annular ring.

There is a further speed reduction unit in which planet pinions eccentrically driven for rotation and revolution around a planetary gear are connected to an output flange by an Oldham's coupling. In this unit, a revolving motion is converted into two linear motions along two perpendicular directions, respectively. Nevertheless, since high accuracy from the Oldham's coupling cannot be expected due to a limited accuracy in the machining thereof and since the components slide linearly, conventional bearing elements cannot be incorporated therein for supporting the sliding components to reduce the abrasion thereof.

Although methods of transmitting from one of two components that turn relative to each other to the other by an eccentric mechanism or a crank mechanism are known, no prior art speed reduction unit of a high reduction ratio is known which uses a set of fixed pins for transmitting a force from a single planet pinion to an output flange, and uses a set of fixed pins for rotatably supporting a floating eccentric disk corresponding to the set of fixed pins.

Still further, no structure is known which is constructed in a single unit by coupling a reduction gear incorporating rotating planet pinions therein, such as a known Harmonic Drive reduction gear, and a motor as a drive element.

Furthermore, all generally known speed reduction gears employ gear wheels, and the meshing gear wheels inevitably generate vibrations and noise.

DISCLOSURE OF THE INVENTION

Therefore, an object of the present invention is to provide an planetary speed reduction gear of a high reduction ratio, capable of providing a reduced rotating speed on an output flange by ingeniously linking a single planet pinion to the output flange, which is an unsolved problem in well-known reduction gears, by a simple mechanism.

Another object of the present invention is to provide a frictional planetary speed or planetary speed reduction unit which operates on the same operating principle as that on which the aforedescribed planetary speed reduction unit operates, reduces an input rotating speed to a reduced output rotating speed by a combination of a revolution path defining element having a frictional inner circumference serving as a revolution path surface, and a friction wheel that frictionally engages with the frictional inner circumference of the revolution path defining element, and reduces vibrations and noise attributable to the operation of meshed gear wheels to the least possible extent.

With the foregoing object in view, the present invention provides an epicyclic or planetary speed reduction unit so that a single planet pinion is eccentrically driven for a revolving or orbiting motion, a floating eccentric disk supported for rotation on a pin attached to an output flange links the planet pinion to the output flange, and the eccentric disk turns relative to the rotating planet pinion.

In accordance with the present invention, there is provided a planetary speed reduction unit provided with an input shaft connected to a drive source, an internal gear serving as an outermost element about the axis of rotation of the input shaft, a single planet pinion to be driven for an eccentric planetary motion inside the internal gear along the intermeshing pitch circle of the internal gear defining a revolution path for a planetary motion through an eccentric mechanism mounted on the input shaft, and an output element for taking out a reduced output speed from the planet pinion;

the planetary speed reduction unit comprising: a housing formed integrally with the internal gear as the outermost element;

an output flange serving as the output element and supported by a bearing means on one end of the housing; and, at least two eccentric transmission assemblies interposed between the planet pinion and the output flange; each eccentric transmission assembly comprising a transmission pin having one end pivotally supported on the output flange at a position radially displaced by a first distance from the axis of rotation of the input shaft, and an eccentric disk connected to the other end of the transmission pin and rotatably supported on the planet pinion at a position radially displaced by a second distance equal to the first distance from the center of the planet pinion, and the input shaft provided with the eccentric mechanism, the output flange and the two eccentric transmission assemblies being disposed so as to form two parallelogram mechanisms.

The planetary speed reduction unit may be additionally provided with a further eccentric transmission assembly in addition to the two eccentric transmission assemblies, and those three eccentric transmission assemblies may be arranged at angular intervals about the axis of the input shaft.

Each of the eccentric transmission assemblies may be formed so as to serve as a positioning means with respect to a direction along the axis of rotation of the planet pinion.

The input shaft may comprise an input external gear supported coaxially with the internal gear on a substantially central portion of the housing, and the shaft of a pinion in engagement with the input external gear, the pinion of the input shaft may be supported on the transmission pin of a predetermined one of the three eccentric transmission assemblies to form the eccentric mechanism mounted on the input shaft, and pinions mounted on the other ends of the other two eccentric transmission assemblies may be in engagement with the input external gear.

The eccentric disk may be driven for rotation by an external drive gear disposed concentrically with the eccentric disk, the pin being formed integrally with the eccentric disk and being rotatably connected to the output flange. Then, a central through-hole for receiving cables and such can be formed through the reduction gear.

When an arrangement is adopted in such a manner that the rotatable eccentric disk is driven by the input shaft provided with the eccentric mechanism contributes to obtain an improvement in which application of radial loading to an offset bearing, that occurs at the eccentric pin rotatably connected to the output shaft of the conventional RV reduction gear, can be avoided.

When connecting the eccentric disk to a motor as a drive element, the eccentric mechanism is rotatably connected to the output flange.

Further, in accordance with the present invention, there is provided a drive unit with a planetary speed reduction unit comprising a housing, an internal gear element formed integrally with the housing, a single planet pinion in eccentric engagement with the internal gear for planetary motion along a revolution or orbiting path defined by the internal gear when driven, an eccentric input shaft coupled to the single planet pinion to apply a drive force to the planet pinion, and an operative interlocking mechanism rotatably connected to the internal gear to interlock the internal gear with the planet pinion; the drive device comprising a motor having a rotor supported on the eccentric input shaft, and a stator supported on the housing and magnetically coupled with the rotor.

The rotor of the motor may be provided with a rotary encoder.

The drive unit may be provided with a braking means in rotational engagement with the rotor of the motor.

The operative interlocking mechanism may be an Oldham's coupling interposed between the single planet pinion and the output flange to transmit the planetary motion of the planet pinion to the concentric output flange.

In accordance with the present invention, there is further provided a frictional planetary speed reduction unit provided with an input shaft connected to a drive source, a revolution path defining element serving as an outermost element about the axis of rotation of the input shaft and having a frictional surface for revolution, an eccentric mechanism mounted on the input shaft, a single planet friction wheel driven by the eccentric mechanism for eccentric planetary motion along the frictional surface of the revolution path defining element, and an output element for taking out a reduced rotating speed from the planet friction wheel;

the frictional planetary speed reduction unit comprising:

a housing formed integrally with the revolution path defining element as the outermost element, an output flange serving as the output element and rotatably supported in a bearing means on one end of the housing, and at least two eccentric transmission assemblies interposed between the planet pinion and the output flange;

each eccentric transmission assembly comprising a transmission pin having one end pivotally supported on the output flange at a position radially displaced by a first distance from the axis of rotation of the input shaft, and an eccentric disk connected to the other end of the transmission pin and rotatably supported on the planet friction wheel at a position radially displaced by a second distance equal to the first distance from the center of the planet friction wheel; and the input shaft provided with the eccentric mechanism, the output flange and the two eccentric transmission assemblies being disposed so as to form two parallelogram mechanisms.

In the planetary speed reduction unit, a rotative input applied to the input shaft is transmitted through the transmission pins of at least the two eccentric transmission assemblies to the output flange by a differential effect of the difference in the number of teeth between the planet pinion and the internal gear.

BRIEF DESCRIPTION OF THE DRAWINGS

The above and other objects, features and advantages of the present invention will become more apparent from the following description taken in connection with the accompanying drawings, in which.

BEST MODE OF CARRYING OUT THE INVENTION

Figure 1:
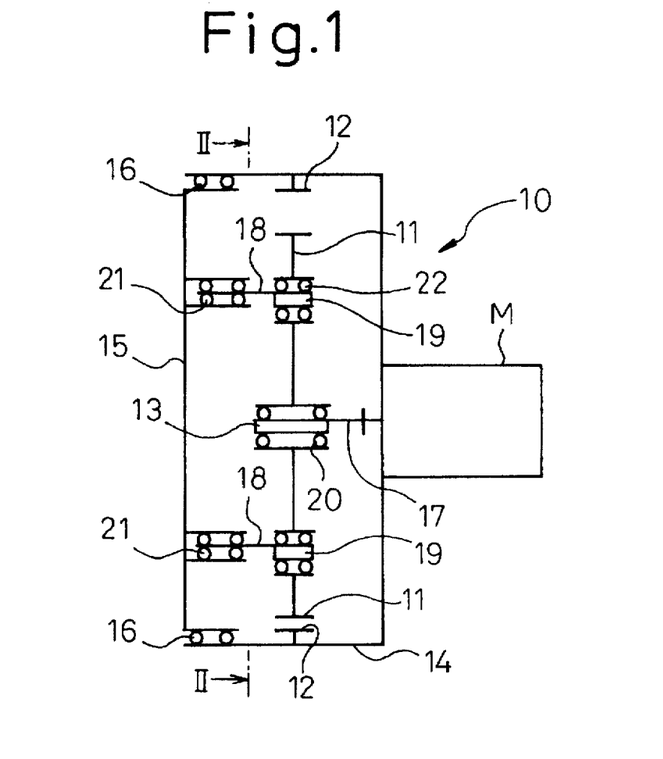
FIG. 1 is a schematic view of a planetary speed reduction unit according to a first embodiment of the present invention.
Figure 2:
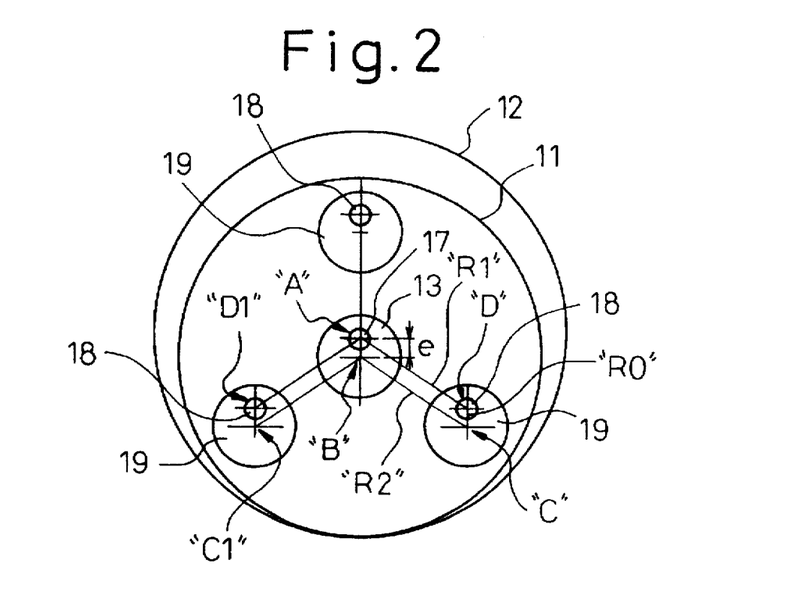
FIG. 2 is a side view taken from the side of an output flange in the direction of the arrows along the line II—II in FIG. 1.

Referring to FIGS. 1 and 2, a planetary speed reduction unit 10 according to a first embodiment of the present invention has a planet pinion 11, and an internal gear 12 formed integrally with a housing 14, i.e., an outermost element of the planetary speed reduction unit 10, which is on the inner surface of the housing 14. The planet pinion 11 and the internal gear 12 are engaged to form a speed reducing element, and the planet pinion 11 rotates about its axis and travels around the inside of the internal gear 12 for revolution along an orbiting path. The center B of the planet pinion 11 is displaced by a distance "e" from the center of the internal gear 12 and the housing 14. The planet pinion 11 is driven by a drive shaft 17 provided with an eccentric disk 13 having a center that turns along an eccentric, circular path with its center at the center "A" and with a radius "e"; that is, the planet pinion 11 in mesh with the internal gear 12 rotates about its axis and, at the same time, travels around the inside of the internal gear 12 when the eccentric disk 13 travels along the eccentric, circular path as the drive shaft 17 rotates, which achieves a speed reducing operation.

The planet pinion 11 is supported in a bearing 20 for rotation relative to the eccentric disk 13 on the latter. An output flange 15 is supported, in a bearing 16 on the housing 14, coaxially with the internal gear 12.

When the planet pinion 11 revolves, the rotation of the planet pinion 11 is transmitted through drive pins 18 and eccentric disks 19 to the output flange 15.

The drive pins 18 are supported for rotation in bearings 21 mounted on the output flange 15, and the eccentric disks 19 are supported for rotation in bearings 22 mounted on the planet pinion 11.

In the described embodiment, the transmission pin members are the three drive pins 18, the three drive pins 18 are joined to the eccentric disks 19, respectively, and each drive pin 18 and the corresponding eccentric disk 19 form an eccentric transmission assembly.

As is obvious from FIG. 2, the eccentricity "AB", i.e., the distance between the center "A" of the drive shaft 17 and the center "B" of the eccentric disk 13, which is equal to the distance "e", and the eccentricity "CD", i.e., the distance between the center "C" of each eccentric disk 19 and the center "D" of the corresponding drive pin 18 are the respective lengths of the two parallel shorter links of a parallel quadric link mechanism defined by a parallelogram ABCD for transmitting the motion of the planet pinion 11 to the output flange 15.

Although the planet pinion 11 revolves at a high revolving speed along a path of revolution defined by the internal gear 12 when the drive shaft 17 directly coupled with the output shaft of a drive motor "M" is driven for rotation at a high rotating speed, the planet pinion 11 rotates about its axis at a very low rotating speed dependent on the difference between the number of teeth of the planet pinion 11 and that of the internal gear 12 and varies its orientation. The variation in the orientation of the planet pinion 11 causes the drive pins 18 to drive the output flange 15 for rotation at a very low rotating speed equal to that of the planet pinion.

Since each drive pin 18 and the corresponding eccentric disk 19 are supported for rotation in bearings 19 and 21 on the output flange 15 and the planet pinion 11, respectively, any additional bearings are unnecessary for supporting the planet pinion 11.

At least two eccentric transmission assemblies disposed at an angular interval are necessary to transmit the torque of the planet pinion 11 to the output flange 15. When the two eccentric transmission assemblies are employed, it is most preferable to dispose the two drive pins 18 on two radii perpendicular to each other, respectively.

The radius of the revolution path, i.e., the eccentricity "e" of the revolving planet pinion 11, is the length of one of the four links, the distance R1 between the center of the revolution path of the planet pinion 11, i.e., the center "A" of the internal gear 12, and the center "D" of the drive pin 18 is the length of an adjacent second link, the eccentricity "e" of the eccentric disk 19 is the length of a third link, and the distance R2 between the center "B" of the planet pinion 11 and the center "C" of the eccentric disk 19 is the length of a fourth link. These links form a parallel quadric link mechanism.

If only one parallel quadric mechanism is formed, no torque can be transmitted from one of the opposite links to the other when the links are aligned and, consequently, the output flange 15 cannot be driven for continuous rotation. When the planetary or planetary speed reduction unit 10 is provided with another eccentric assembly including an eccentric disk 19 with its center C1 and a drive pin 18 with its center D1 is formed in addition to the former, two parallel quadric mechanisms are formed and one of the two parallel quadric mechanisms can achieve optimum torque transmission even if the links of the other parallel quadric mechanism are aligned.

Preferably, the planetary speed reduction unit 10 must be provided with three eccentric transmission assemblies as shown in FIG. 2 in view of symmetry, regular arrangement of the eccentric transmission assemblies and uniform distribution of load to the components. When the planetary speed reduction unit 10 is provided with three eccentric transmission assemblies, the sizes of the components of the eccentric transmission assemblies and the overall diameter of the planetary speed reduction unit 10 are reduced. A multiple-throw cranks have been used as eccentric elements by the known reduction gears, such as RV reduction gears, for transmitting a force from the revolution path defining gear to the output flange. However, the planetary speed reduction gear of the present invention has a very simple construction further simplified by the employment of the eccentric elements and is capable of achieving a high reduction ratio by a single step of speed reduction.

Figure 3:
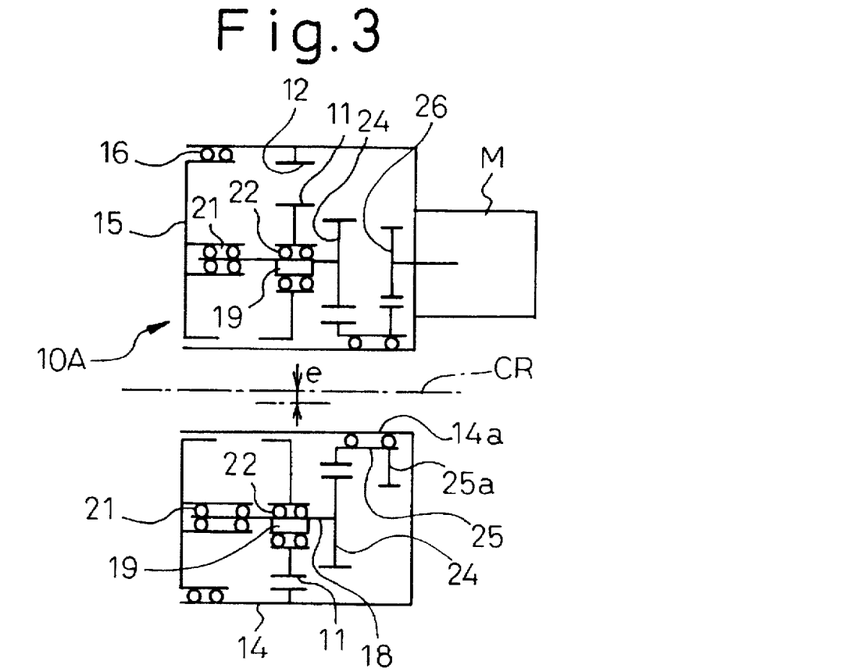
FIG. 3 is a schematic view, similar to FIG. 1, of a planetary speed reduction gear according to a second embodiment of the present invention.

Referring to FIG. 3, in which parts like or corresponding to those of the first embodiment are designated by the same reference numerals, an planetary or planetary speed reduction unit 10A according to a second embodiment of the present invention has a central through-hole 14a about its center axis CR.

In the second embodiment, the central through-hole 14a extends through the central region of a housing 14. Pinions 24 are attached to drive pins 18, respectively, in a cylindrical space defined by the housing 14. A central input gear 25, i.e., a compound gear, has an input gear 25a meshed with a motor pinion 26 which is driven by a motor "M" and an intermediate gear 25b coaxial with the input gear 25a. The pinions 24 are meshed with the intermediate gear 25b. Since the planetary speed reduction unit 10A of the second embodiment has the central through hole 14a, the motor "M" can be eccentrically supported on the housing 14. Since electric wires, signal lines and such can be passed through the central through-hole 14a, the construction of the planetary speed reduction unit 10A is very advantageous when connecting a drive source to the planetary speed reduction unit 10A to construct a drive device integrally including a reduction gear and a drive source.

Figure 4:
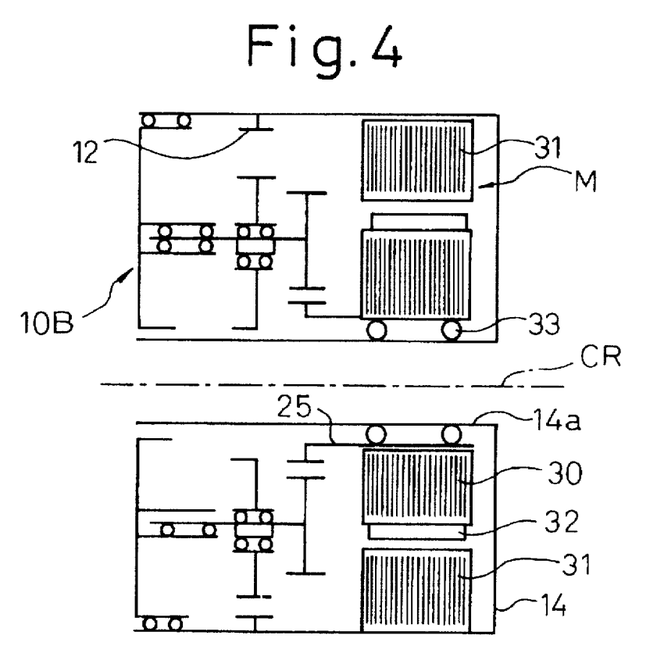
FIG. 4 is a schematic view of a drive unit with a built-in speed reduction unit, according to a third embodiment of the present invention.

FIG. 4, in which parts like or corresponding to those of the above-mentioned embodiments are designated by the same reference numerals, shows an epicyclic or planetary reduction unit 10B with a built-in drive source according to a third embodiment of the present invention serving as a drive unit.

Referring to FIG. 4, a motor "M" has a rotor 30 provided with a plurality of permanent magnets 32 arranged at intervals on its circumference is supported on a central input gear 25, and a stator 31 held on a housing 14 integrally provided with an internal gear 12. The rotor 30 of the motor "M" is supported in an additional bearing 33. Although not shown, an encoder device to detect the operating speed of the motor "M" or a brake for braking the rotor 30 may be incorporated into the motor "M".

The planetary speed reduction unit 10B may be combined with a rotary joint disclosed in the specification and the drawings of U.S. Pat. No. 5,298,107 relevant to the invention of the present patent application to drive the planet pinion of the planetary speed reduction unit 10B for an eccentric motion by the hollow rotor of a motor. The central input gear 25 may be formed integrally with the rotor 30 to form a comparatively large central hole through the planetary speed reduction gear 10B.

A structure formed by combining a motor proposed in U.S. Pat. No. 5,293,107 and a single planet pinion may be provided with an Oldham's coupling as a modification of a combination of pins and an eccentric element similar to a Scan drive coupling.

Although foregoing embodiments are planetary speed reduction units provided, as an essential component, with the single planet pinion that revolves along the revolving or orbiting path defined by the internal gear and a drive unit integrally provided with such an planetary speed reduction gear, the present invention may be embodied in a frictional epicyclic reduction unit or a drive unit integrally provided with a frictional epicyclic reduction unit provided with a cylindrical surface element instead of the internal gear, a planet wheel element instead of the planet pinion engaged with the internal gear, and a friction member of a frictional material, such as rubber, attached to the outer circumference of the cylindrical surface element or the outer circumference of the planet wheel element, and designed to transmit a reduced rotating speed from the planet wheel element through at least two eccentric transmission assemblies to an output flange. In such a frictional epicyclic reduction unit, since the difference in curvature between the inner circumference of the cylindrical surface element and the planet wheel element is relatively small, a contact area between the cylindrical surface element and the planet wheel element is comparatively large and hence a comparatively large torque can be transmitted.

Figure 5:
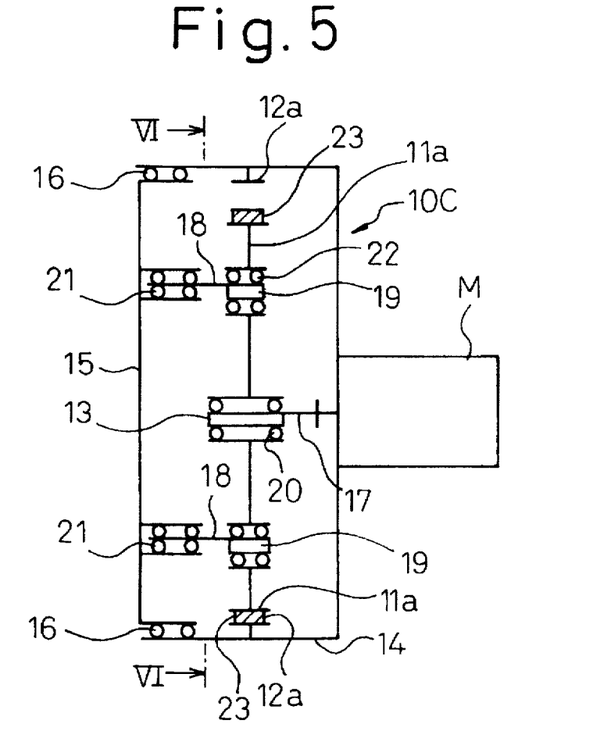
FIG. 5 is a schematic view of a frictional planetary speed reduction unit according to a fourth embodiment of the present invention.
Figure 6:
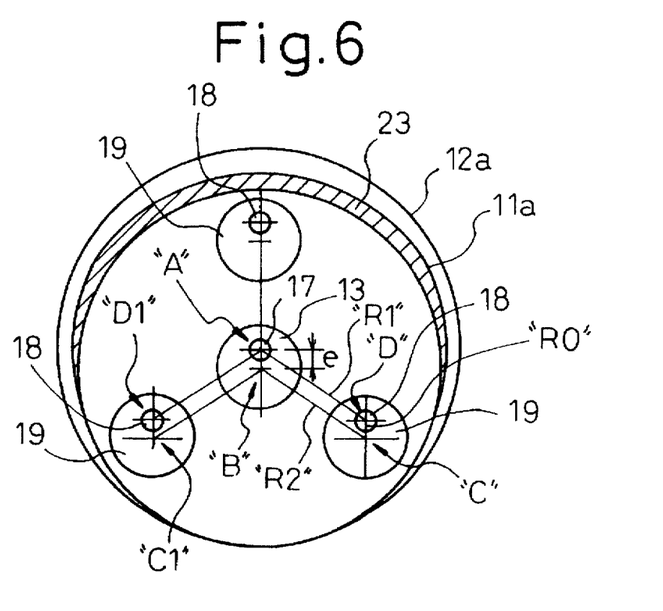
FIG. 6 is a side view taken from the side of an output flange in the direction of the arrows along the line VI—VI in FIG. 5.

FIGS. 5 and 6 show a frictional epicyclic reduction unit 10C according to a fourth embodiment of the present invention, based on the planetary speed reduction unit shown in FIGS. 1 and 2. The frictional epicyclic reduction unit 10C employs a cylindrical friction surface element 12a having a comparatively highly frictional inner frictional circumference instead of the internal gear 12, and a planet wheel element 11a having an outer circumference coated with a frictional member 23 formed of a frictional material instead of the planet pinion 11. The rest of the components of the frictional epicyclic speed reduction unit 10C are the same as those of the embodiment shown in FIGS. 1 and 2. The planet wheel element 11a rotates about its axis and orbits along an orbiting or revolving path defined by the inner frictional circumference of the friction surface element 12a to provide a speed reducing effect according to the difference in diameter between the circumference of the planet wheel element 11a and the inner circumference of the friction wall element 12a.

The frictional member 23 may be attached to either the circumference of the planet wheel element 11a or the inner circumference of the friction surface element 12a by a suitable method, such as a method using an adhesive.

Although the power transmitting capacity of such a friction type power transmitting system is small as compared with that of a toothed-gear type power transmitting system, the friction type power transmitting system is capable of smooth power transmission, generates less vibration and resultant noise than the gear type power transmitting system and is highly effective in reducing the noise of the reduction gear.

Whereas the tooth surfaces of meshed gears slip inevitably relative to each other when transmitting power, the friction wheel element does not slip relative to the friction wall element, provided that the friction wheel is not excessively loaded, and the friction type power transmitting system is able to transmit power at a high transmission efficiency. The friction wheel element and the friction surface element are easier to make by machining and simpler in shape than gears, which is advantageous in manufacturing costs.

Figure 7:
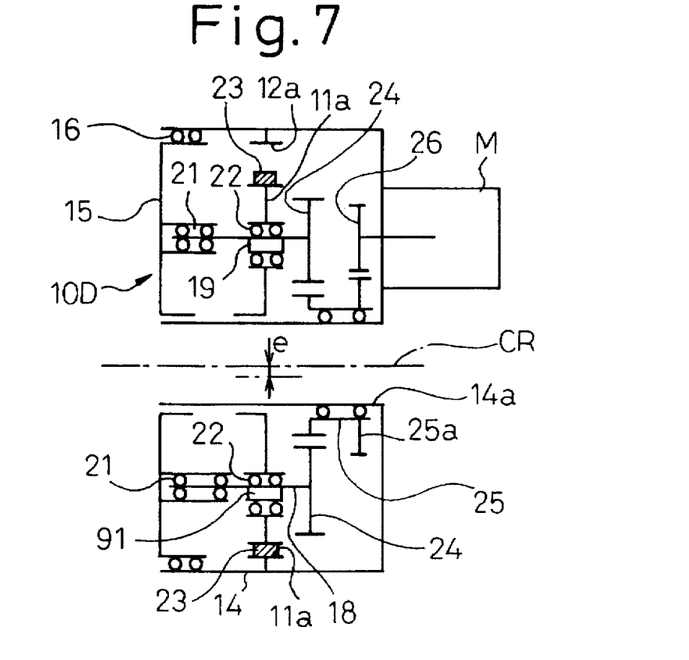
FIG. 7 is a schematic view, similar to FIG. 5, of a frictional planetary speed reduction unit according to a fourth embodiment of the present invention.

FIG. 7 shows a frictional epicyclic speed reduction unit 10D according to a fifth embodiment of the present invention, based on the planetary speed reduction unit of FIG. 3. The frictional epicyclic speed reduction unit 10D employs a friction wheel element 11a instead of the planet pinion 11 of the planetary speed reduction unit 10A of FIG. 3. The friction wheel element 11a is in frictional engagement with the inner circumference of a friction surface element 12a through a frictional member 23. The rest of the components of the frictional epicyclic speed reduction gear 10D are the same as those of the speed reduction unit 10A of FIG. 3.

Figure 8:
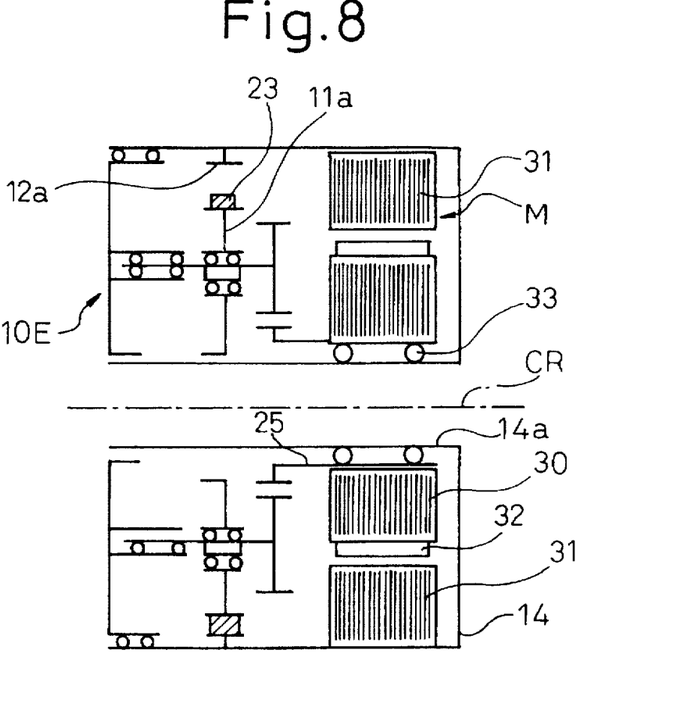
FIG. 8 is a schematic view of a drive device with a built-in frictional planetary speed reduction unit, according to a fifth embodiment of the present invention.

FIG. 8 shows a frictional epicyclic speed reduction unit 10E according to a sixth embodiment of the present invention, based on the planetary speed reduction unit of FIG. 4.

In the frictional epicyclic speed reduction unit 10E, similarly to the embodiment shown in FIG. 6, a frictional member 23 is interposed between a friction wheel element 11a and a friction surface element 12a having a frictional inner circumference. The rotation and the revolution of the friction wheel element 11a in frictional engagement with the friction surface element 12a provides a reduced rotating speed. The actions and effects of the frictional epicyclic reduction gear 10E are similar to those of the embodiment shown in FIG. 6.

As is apparent from the foregoing description, the planetary speed reduction units and the frictional epicyclic speed reduction gear according to the present invention are more advantageous than the prior art speed reduction units in that the connecting links are simplified and that the cylindrical elements and standard bearings can be easily manufactured to an accuracy less than the accuracy that the components of the precision reduction gears must be manufactured.

The speed reduction unit of the present invention needing only a comparatively small number of comparatively simple mechanical parts, can be manufactured at low manufacturing cost, and the simple construction enhances the accuracy and reliability of the reduction gear. Accordingly, the application of the reduction gear of the present invention to a robot joint makes it possible to provide a highly accurate motor-driven robot joint, i.e., a drive unit with a built-in reduction gear, at low cost.

I claim:

1. A planetary speed reduction unit provided with an input shaft connected to a drive source, an internal gear serving as an outermost element about the axis of rotation of the input shaft, a single planet pinion to be driven for an eccentric planetary motion inside the internal gear along the intermeshing pitch circle of the internal gear defining an orbiting path for a planetary motion through an eccentric mechanism mounted on the input shaft, and an output element for obtaining a reduced output speed from said planet pinion;

said planetary speed reduction unit comprising:
   a housing formed integrally with said internal gear as said outermost element,
   an output flange serving as said output element and supported by bearing means on one end of said housing, and
   at least two eccentric transmission assemblies interposed between said planet pinion and said output flange;
   each of said eccentric transmission assemblies comprising a transmission pin having one end pivotally supported on said output flange at a position radially displaced by a first distance from the axis of rotation of said input shaft, and an eccentric disk connected to the other end of said transmission pin and rotatably supported on said planet pinion at a position radially displaced by a second distance equal to the first distance from the center of said planet pinion; and said input shaft provided with said eccentric mechanism, said output flange and said two eccentric transmission assemblies being disposed so as to form two parallel quadric mechanisms.

2. A planetary speed reduction unit according to claim 1, further comprising an additional eccentric transmission assembly in relation to said two eccentric transmission assemblies, wherein said three eccentric transmission assemblies are arranged at angular intervals about the axis of said input shaft.

3. A planetary speed reduction unit according to claim 1 or 2, wherein each of said eccentric transmission assemblies are formed so as to serve as a positioning means with respect to a direction along the axis of rotation of said planet pinion.

4. A planetary speed reduction unit according to claim 2, wherein said input shaft comprises an input externally toothed gear supported coaxially with said internal gear on a substantially central portion of said housing, and a shaft of a pinion in engagement with said input externally toothed gear, wherein said pinion of said input shaft is supported on a transmission pin of a predetermined one of said three eccentric transmission assemblies to form an eccentric mechanism mounted on said input shaft, and
   wherein pinions mounted on the other ends of said other two eccentric transmission assemblies are in engagement with said input external gear.

5. A planetary speed reduction unit according to any one of claims 2 or 4, further comprising an encoder for detecting the rotating speed of said output shaft of said output flange.

6. A planetary speed reduction unit according to claim 1, wherein said drive source is an electric motor directly attached to or built in said housing.

7. A frictional epicyclic speed reduction unit provided with an input shaft connected to a drive source, an orbiting path defining element serving as an outermost element about the axis of rotation of said input shaft and having a frictional surface for an orbiting motion, an eccentric mechanism mounted on said input shaft, a single planet friction wheel driven by said eccentric mechanism for eccentric planetary motion along said frictional surface of said revolution path defining element, and an output element for obtaining a reduced rotating speed from said planet friction wheel;

said frictional epicyclic speed reduction unit comprising:
   a housing formed integrally with said orbiting path defining element as said outermost element,
   an output flange serving as said output element and rotatably supported in bearing means on one end of said housing, and
   at least two eccentric transmission assemblies interposed between said planet pinion and said output flange;
   each eccentric transmission assembly comprising a transmission pin having one end pivotally supported on the output flange at a position radially displaced by a first distance from the axis of rotation of said input shaft, and an eccentric disk connected to the other end of said transmission pin and rotatably supported on said planet friction wheel at a position radially displaced by a second distance equal to the first distance from the center of said planet friction wheel; and said input shaft provided with said eccentric mechanism, said output flange and said two eccentric transmission assemblies being disposed so as to for two parallel quadric mechanisms.

8. A frictional epicyclic speed reduction unit according to claim 7, wherein said drive source comprises a drive motor directly attached to or built in said housing.

9. A drive unit with a built-in speed reduction unit provided with a speed reduction unit comprising a housing, an internal gear element formed integrally with the housing, a single planet pinion in eccentric engagement with the internal gear for planetary motion along an orbiting path when driven, and an eccentric input shaft linked to the single planet pinion to apply a drive force for planetary motion to said planet pinion; said drive unit comprising:

a motor having a rotor supported on said eccentric input shaft, and a stator supported on said housing and magnetically coupled with said rotor;

at least two eccentric transmission assemblies interposed between said planet pinion and an output flange;

each of said eccentric transmission assemblies comprising a transmission pin having one end pivotally supported on said output flange at a position radially displaced by a first distance from the axis of rotation of said input shaft, and an eccentric disc connected to the other end of said transmission pin and rotatably supported on said planet pinion at a position radially displaced by a second distance equal to the first distance from the center of said planet pinion; and said input shaft, said output flange and said two eccentric transmission assemblies being disposed so as to form two parallel quadric mechanisms.

10. A drive unit with a built-in reduction gear, according to claim 9, further comprising an encoder for detecting the rotating speed of said output flange.

* * * * *